(12) United States Patent
Wang et al.

(10) Patent No.: US 10,439,511 B2
(45) Date of Patent: Oct. 8, 2019

(54) THREE PHASE INVERTER GRID VOLTAGE FEED FORWARD METHOD UNDER UNBALANCED OPERATING CONDITIONS

(71) Applicant: S&C Electric Company, Chicago, IL (US)

(72) Inventors: Zitao Wang, Greenfield, WI (US); Mouzhi Dong, New Berlin, WI (US); James Fisher, New Berlin, WI (US)

(73) Assignee: S&C Electric Company, Chicago, IL (US)

( * ) Notice: Subject to any disclaimer, the term of this patent is extended or adjusted under 35 U.S.C. 154(b) by 0 days.

(21) Appl. No.: 16/217,492

(22) Filed: Dec. 12, 2018

(65) Prior Publication Data

US 2019/0245458 A1 Aug. 8, 2019

Related U.S. Application Data

(60) Provisional application No. 62/625,992, filed on Feb. 3, 2018.

(51) Int. Cl.
| | |
|---|---|
| H02M 3/335 | (2006.01) |
| H02M 7/48 | (2007.01) |
| H02M 7/5395 | (2006.01) |
| H02M 1/12 | (2006.01) |
| H02M 7/497 | (2007.01) |

(52) U.S. Cl.
CPC .......... *H02M 7/4826* (2013.01); *H02M 1/12* (2013.01); *H02M 3/335* (2013.01); *H02M 7/497* (2013.01); *H02M 7/5395* (2013.01)

(58) Field of Classification Search
None
See application file for complete search history.

(56) References Cited

U.S. PATENT DOCUMENTS

2017/0047861 A1* 2/2017 Sakimoto .................. H02J 3/38

* cited by examiner

*Primary Examiner* — Jeffrey A Gblende (57) ABSTRACT

A system and method for controlling a grid-connected inverter to provide negative sequence current during unbalanced grid operating conditions. The system uses a combination of feedforward and feedback controls to compute voltage signals which are used to control the inverter switches. The system includes both positive and negative sequence current controllers with voltage feedforward terms. The measured grid voltage is directly fed forward to the positive sequence control through a predictive algorithm, so that the instantaneous voltage information is kept, reducing the influence of grid voltage harmonics on the quality of the output current. The predictive voltages include positive, negative and harmonic component information of the grid voltage signals.

20 Claims, 6 Drawing Sheets

THREE PHASE INVERTER GRID VOLTAGE FEED FORWARD METHOD UNDER UNBALANCED OPERATING CONDITIONS

CROSS-REFERENCE TO RELATED APPLICATION

This application claims the benefit of priority from the U.S. Provisional Application No. 62/625,992, filed on Feb. 3, 2018, the disclosure of which is hereby expressly incorporated herein by reference for all purposes.

BACKGROUND

Field

The present disclosure relates generally to a control scheme for a grid-connected three phase inverter which includes negative sequence current. More particularly, it relates to a control method and system for a grid-connected reactive power compensation inverter which delivers both positive and negative sequence currents to compensate for an unbalanced operating condition in the three phases of the grid. The grid voltage is directly fed forward to the positive sequence control through a predictive algorithm, so that the instantaneous voltage information is kept, reducing the influence of grid voltage harmonics on the quality of the output current. The predictive voltages include positive, negative and harmonic component information of the grid voltage signals.

Discussion of the Related Art

An electrical power transmission/distribution network, often referred to as an electrical grid, typically includes a number of power generation plants each including a number of power generator units, such as gas turbine engines, nuclear reactors, coal-fired generators, hydro-electric dams, etc. The grid may also include wind and/or solar energy generation farms. Not only are there many different types of energy generators on the grid, but there are also many different types of loads, and the generators and loads are distributed over large geographic areas. In light of the wide distribution of generation and variability of loads, and in light of stricter regulations concerning grid stability, grid power management has become increasingly important.

Grid power management includes both management of active (real) power to match customer load, and management of reactive power. Reactive power requirements vary over time, and also vary by location on the grid—as customers with large reactive loads (such as induction motors) can significantly affect reactive power requirements in a particular portion of the grid. Reactive power compensation inverters have been developed which are connected to the grid at various locations as needed—such as at substations, at wind or solar generation farms, or at large industrial customer sites—and provide reactive power of the phase and amplitude needed. These grid-connected compensation inverters serve a valuable function in maintaining grid stability, and also assist industrial customers with large inductive loads in maintaining an acceptable power factor.

In addition to normal operations where they provide the required reactive power, grid-connected compensation inverters of the type discussed above must be able to react and respond to grid disturbances which may create an unbalanced condition between the three phases of the grid. When an unbalanced condition exists on the grid, such as a low voltage on one of the phases, it is necessary to modify the current provided by the inverter to include what is known as negative sequence current. Inverters capable of providing negative sequence current have been developed, but they have difficulty handling positive and negative sequence voltage signals. These inverters either give up voltage feedforward control, or they use a filtered voltage feedforward signal which is both time-delayed and lacking important harmonic information. As a result, these inverters cannot accurately compute control signals which effectively provide the negative sequence current required to restore balanced grid conditions.

There is a need for more advanced inverter control schemes which enable the inverter to provide timely and precise negative sequence current during imbalanced grid operating conditions in order to restore balance among the three phases.

SUMMARY

The present disclosure describes a system and method for controlling a grid-connected inverter to provide negative sequence current during unbalanced grid operating conditions. The system uses a combination of feedforward and feedback controls to compute voltage signals which are used to control the inverter switches. The system includes both positive and negative sequence current controllers with voltage feedforward terms. The measured grid voltage is directly fed forward to the positive sequence control through a predictive algorithm, so that the instantaneous voltage information is kept, reducing the influence of grid voltage harmonics on the quality of the output current. The predictive voltages include positive, negative and harmonic component information of the grid voltage signals.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a three phase inverter grid voltage feedforward control method for unbalanced operating conditions is merely exemplary in nature, and is in no way intended to limit the disclosure or its applications or uses.

Figure 1:
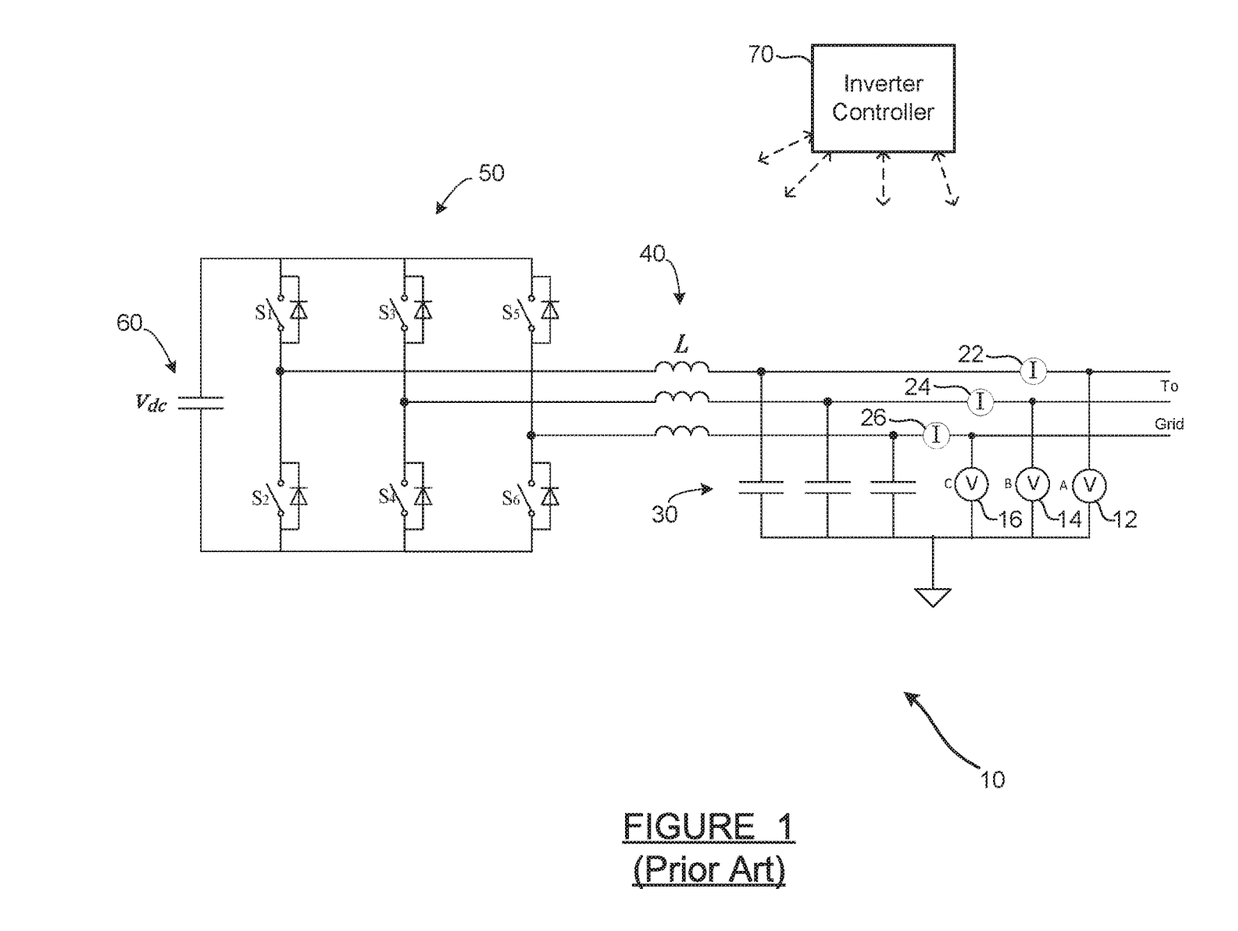
FIG. 1 is a schematic diagram of a grid-connected reactive power compensation inverter of a type known in the art.

FIG. 1 is a schematic diagram of a grid-connected reactive power compensation inverter 10 of a type known in the art. The inverter 10 is not a power generator or powerplant, and does not provide real power to the grid. Rather, the inverter 10 is designed to use a capacitor bank and an array of high-speed, high-power switches to transform grid power into reactive power to compensate for local conditions on the grid that is, to compensate for situations where grid current leads or lags grid voltage by a significant phase angle. As is known in the art, it is desirable to maintain the lead/lag phase angle of grid voltage/current within a certain band, and this is what the reactive power compensation inverter 10 is designed to do.

The inverter 10 is a three phase device which is coupled to all three phase lines (ABC) of the grid. For the purposes of the discussion in this disclosure, the grid is an alternating current (AC) network, and the nominal operating frequency is 60 Hz unless otherwise noted. Grids in some parts of the world operate at other frequencies, such as 50 Hz, and the control principles discussed herein are applicable to these as well. Grid voltage for all three phases is measured by voltage sensors 12, 14 and 16. The voltage sensors measure voltage amplitude and phase angle, which are used in the control calculations discussed below. Current flowing between the grid and the inverter 10 is measured for all three phases by current sensors 22, 24 and 26.

The inverter 10 includes filters for conditioning the voltage and current delivered to the grid. A capacitive filter section 30 and an inductive filter section 40 are shown, where the filter sections 30 and 40 perform functions such as removing higher-order harmonics of the 60 Hz AC frequency from the voltage and current delivered to the grid.

A switch section 50 includes six high-power switches ($S_1$-$S_6$), each with a free-wheeling diode in parallel, as would be understood by one skilled in the art. The switches in the switch section 50 are modulated (switched open and closed rapidly according to a computed modulation scheme) in order to provide the desired reactive power to the grid. In one embodiment, the switches are Insulated Gate Bipolar Transistors (IGBTs), which have fast switching and high current carrying capability. Other types of switches may also be used in the switch section 50.

A DC-link capacitor bank 60 provides energy storage capacity whereby the inverter 10 can absorb power from the grid and return it to the grid at the required reactive amplitude and phase. A voltage $v_{dc}$ across the DC-link capacitor bank 60 is measured by a voltage sensor and used in the calculations discussed below.

An inverter controller 70 is in communication with the voltage sensors 12/14/16, the current sensors 22/24/26, the voltage sensor at the DC-link capacitor bank 60, and the switches $S_1$-$S_6$ in the switch section 50. The controller 70 is also in communication with a master controller (not shown) which determines an amount of reactive power needed by the grid at the location of the inverter 10, and provides a signal indicative of this reactive power requirement. This is all discussed further below.

In a balanced three phase system, the three voltages (and three currents) are identical except for exact 120° phase shifts. Unbalanced conditions may arise from unequal voltage sources or loads, or from faults. It is possible to analyze some simple types of unbalanced networks using straightforward solution techniques and wye-delta transformations. However, power networks can become quite complex and many situations would be very difficult to handle using ordinary network analysis. For this reason, a technique known as symmetrical components has been developed.

The basis for this analytical technique is a transformation of the three voltages and three currents into a second set of voltages and currents known as the symmetrical components. The three component variables are called positive sequence, negative sequence and zero sequence. Positive sequence is the familiar set of voltage signals where phase B lags phase A by 120°, phase C lags phase B and phase A lags phase C. In the negative sequence, the sequence of voltages is reversed: phase B now leads phase A rather than lagging, etc. Zero sequence is required to make up the difference between the total phase variables and the two rotating components.

The current injected into the grid by the inverter 10 should keep a certain relationship with the voltage in order to meet the local reactive power requirement. This relationship is decided by a system master controller. As mentioned above, the three phase voltages can become unbalanced because of either transient grid faults or a seriously unbalanced three-phase load. The inverter 10 is usually linked by a three-wire connection, so it does not inject zero sequence current into the grid, as a result the zero sequence component of the voltage vector will be intentionally ignored in the following discussion. Thus, the grid voltage is divided into positive sequence and negative sequence components. To reduce unbalanced voltage influence, the positive sequence and negative sequence currents should be controlled at the same time.

Under generic grid condition and without zero sequence voltage, the voltage can be written as:

$$v = \sum_{n=1}^{\infty} (v^{+n} + v^{-n}) = \qquad (1)$$

$$\sum_{n=1}^{\infty} \left( V^{+n} \begin{bmatrix} \cos(n\omega t + \phi^{+n}) \\ \cos\left(n\omega t - \frac{2\pi}{3} + \phi^{+n}\right) \\ \cos\left(n\omega t + \frac{2\pi}{3} + \phi^{+n}\right) \end{bmatrix} + V^{-n} \begin{bmatrix} \cos(n\omega t + \phi^{-n}) \\ \cos\left(n\omega t + \frac{2\pi}{3} + \phi^{-n}\right) \\ \cos\left(n\omega t - \frac{2\pi}{3} + \phi^{-n}\right) \end{bmatrix} \right)$$

Where superscripts +n, −n represent the positive and negative sequence components, respectively, of the n th harmonic of voltage vector v, ω is angular frequency of the AC waveform, and φ is a phase angle.

Likewise, the input/output current of an inverter can be generally expressed as:

$$i = \sum_{n=1}^{\infty} (i^{+n} + i^{-n}) = \qquad (2)$$

$$\sum_{n=1}^{\infty} \left( I^{+n} \begin{bmatrix} \cos(n\omega t + \delta^{+n}) \\ \cos\left(n\omega t - \frac{2\pi}{3} + \delta^{+n}\right) \\ \cos\left(n\omega t + \frac{2\pi}{3} + \delta^{+n}\right) \end{bmatrix} + I^{-n} \begin{bmatrix} \cos(n\omega t + \delta^{-n}) \\ \cos\left(n\omega t + \frac{2\pi}{3} + \delta^{-n}\right) \\ \cos\left(n\omega t - \frac{2\pi}{3} + \delta^{-n}\right) \end{bmatrix} \right)$$

Where ω is again angular frequency (ω=2πf where f is AC line frequency of 60 Hz) and δ is a phase angle.

When n=1, the related components are called the positive and negative fundamental components. When n>1, the related components are considered as harmonic components.

In normal grid operating conditions, the negative component does not exist, but harmonic components exist all the time. For example, the recommended IEEE harmonic voltage limits allow total harmonic distortion (THD) as high as 8% on low voltage lines (V≤1.0 kV), and as high as 2.5% on high voltage lines (69 kV<V≤161 kV).

When an unbalanced grid voltage appears (negative sequence), the inverter 10 not only needs to input/output positive sequence current, but also needs to input/output negative sequence current.

As is known in the art, many three phase power systems are analyzed in what is known as a synchronous reference frame, which is a reference frame which rotates at the AC line frequency (60 Hz in this case). A synchronous reference frame includes direct and quadrature (or dq) components. Existing control systems usually use decoupled double synchronous reference frame currents for unbalanced current injection. But during dq axis current/voltage transformation from the measured currents/voltages, a cross-coupling phenomenon occurs. For example:

$$\begin{bmatrix} i_d^+ \\ i_q^+ \end{bmatrix} = \begin{bmatrix} \cos(\omega t) & \sin(\omega t) \\ -\sin(\omega t) & \cos(\omega t) \end{bmatrix} \begin{bmatrix} i_\alpha \\ i_\beta \end{bmatrix} = \quad (3)$$

$$\begin{bmatrix} \cos(\omega t) & \sin(\omega t) \\ -\sin(\omega t) & \cos(\omega t) \end{bmatrix} \left[ I^+ \begin{bmatrix} \cos(\omega t + \delta^+) \\ \sin(\omega t + \delta^+) \end{bmatrix} + I^- \begin{bmatrix} \cos(\omega t + \delta^{-1}) \\ -\sin(\omega t + \delta^{-1}) \end{bmatrix} \right] =$$

$$I^+ \begin{bmatrix} \cos(\delta^+) \\ \sin(\delta^+) \end{bmatrix} + I^- \begin{bmatrix} \cos(2\omega t + \delta^{-1}) \\ -\sin(2\omega t + \delta^{-1}) \end{bmatrix}$$

$$\begin{bmatrix} i_d^- \\ i_q^- \end{bmatrix} = \begin{bmatrix} \cos(\omega t) & -\sin(\omega t) \\ \sin(\omega t) & \cos(\omega t) \end{bmatrix} \begin{bmatrix} i_\alpha \\ i_\beta \end{bmatrix} = \quad (4)$$

$$I^+ \begin{bmatrix} \cos(2\omega t + \delta^+) \\ \sin(2\omega t + \delta^+) \end{bmatrix} + I^- \begin{bmatrix} \cos(\delta^{-1}) \\ -\sin(\delta^{-1}) \end{bmatrix}$$

Where $i_d^+$ is the positive sequence direct current, is is the positive sequence quadrature current (and similarly for negative sequence), and $i_\alpha$ and $i_\beta$ are the two phase currents in a non-rotating reference frame transformed from the three phase line currents.

Figure 2:
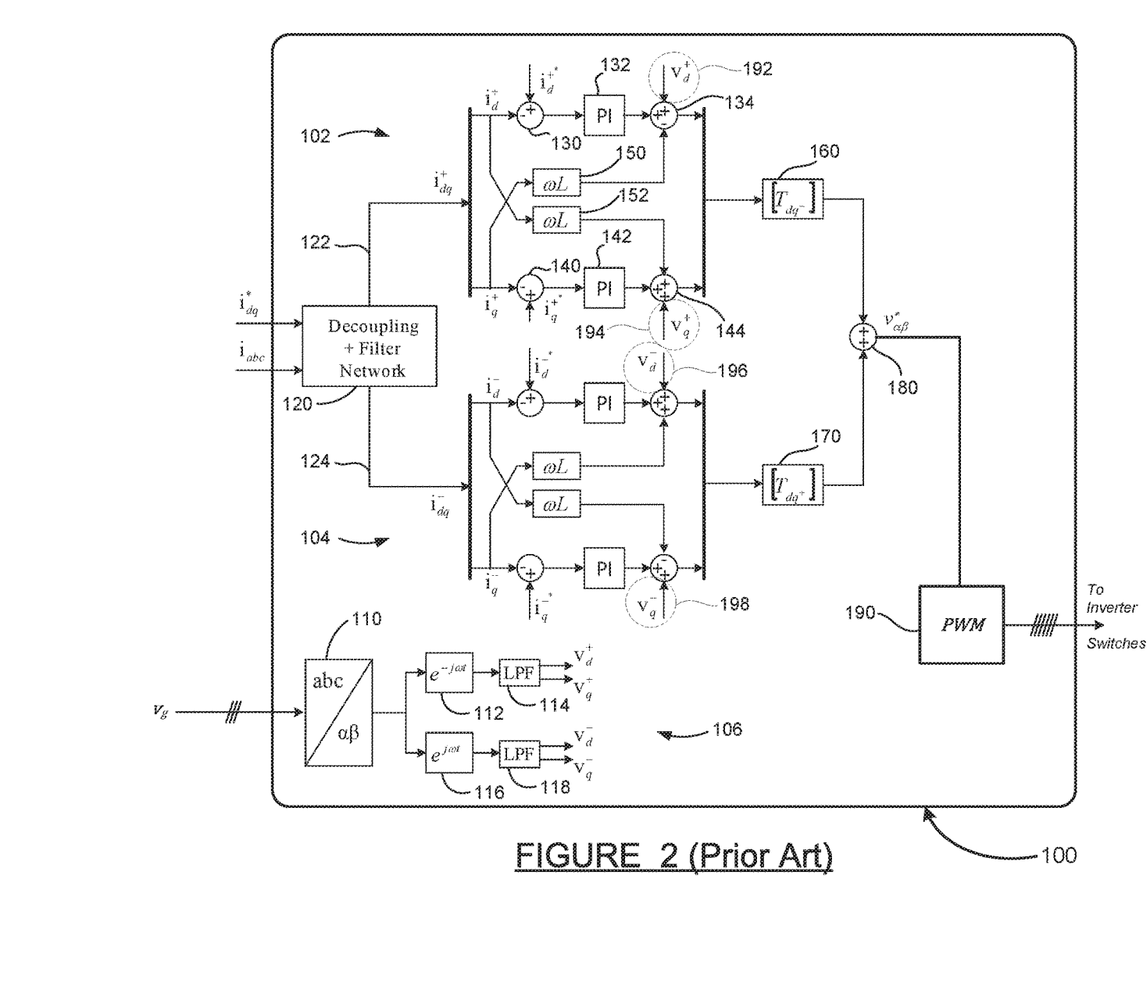
FIG. 2 is a block diagram of a decoupled double synchronous controller using a known control scheme for controlling the inverter of FIG. 1.

FIG. 2 is a block diagram of a double synchronous controller 100 employing a known control scheme for controlling the inverter 10 of FIG. 1. The controller 100 is a particular embodiment of the controller 70 of FIG. 1, communicating with and controlling the grid-connected inverter 10. The controller 100 is described as double synchronous because it includes both a positive sequence control section 102 and a negative sequence control section 104, discussed below.

In a double synchronous reference frame control system such as the controller 100, the interaction between current vectors and reference frames with different sequences gives rise to oscillations in the dq output signals. These oscillations, which are the 2ω terms in Equations (3) and (4), should be cancelled out in order to achieve full control of the injected currents under unbalanced conditions. This will be addressed below in discussions of a decoupling & filter network.

The controller 100 also includes a voltage transformation section 106. In the voltage transformation section 106, three phase measured grid voltages are provided to a transformation block 110 which transforms the three phase signals of lines abc to a two phase fixed reference frame (αβ), as is understood in the art. The αβ voltage signals are provided to a positive sequence transformation block 112 where positive sequence dq voltages are computed. The positive sequence dq voltages are passed through a low-pass filter 114 to produce the positive sequence direct and quadrature voltage components, $vi_d^+$ and $v_q^+$, respectively, which are used as feedforward signals in the control sections 102 and 104. Throughout this disclosure, the letters dq together, in discussion or in a variable subscript, denote direct and quadrature.

In the main control branch of the controller 100, three phase line currents and dq reference (or target) currents are provided to a decoupling & filter network 120. The three phase line currents are measured by the sensors 22/24/26 of FIG. 1. The direct reference current may be calculated in another part of the controller 100 (not shown) based on a calculation involving the DC-link voltage $v_{dc}$ across the DC-link capacitor bank 60. The quadrature reference current is provided by the master controller mentioned previously, and is based on the amount of reactive power required by the grid.

The decoupling & filter network 120 decouples and filters the input current signals to produce dq positive sequence currents on line 122 and dq negative sequence currents on line 124. The internal working of the decoupling & filter network 120 will be discussed in a later figure. Following is a discussion of the calculations in the positive sequence control section 102. An identical set of control calculations are carried out in the negative sequence control section 104, but discussion of these will be omitted for brevity.

The dq positive sequence currents on line 122 are separated into the two components, with direct being processed in the upper branch and quadrature being processed in the lower branch. The positive sequence direct current $i_d^+$ is provided to a summing junction 130. The summing junction 130 computes a difference between a positive sequence direct reference current $i_d^+$ * and the positive sequence direct current $i_d^+$. The difference or error between the positive sequence direct reference current $i_d^+$ * and the positive sequence direct current $i_d^+$ is provided to a proportional-integral (PI) controller 132 where an output is computed based both on an error (difference) value and on an integral of the error value, as is well understood in the art. The PI controller 132 provides its output to a summing junction 134, which also receives two other inputs—the positive sequence direct voltage component $v_d^+$ from the voltage transformation section 106, and a cross-couple feedforward term which will be discussed below.

Quadrature current calculations are performed in a like manner to the direct current calculations discussed above. A summing junction 140 receives and computes a difference between a positive sequence quadrature reference current $i_q^+$ * and the positive sequence quadrature current $i_q^+$. The difference or error between the positive sequence quadrature reference current $i_q^+$ * and the positive sequence quadrature current is is provided to a proportional-integral (PI) controller 142 which operates as discussed previously. The PI controller 142 provides its output to a summing junction 144, which also receives two other inputs the positive sequence quadrature voltage component $v_q^+$ from the voltage transformation section 106, and a cross-couple feedforward term which will be discussed below.

The cross-couple feedforward terms are computed as follows. The positive sequence quadrature component of current $i_q^+$ is provided to a multiplier 150 where it is multiplied by ωL (ω=2πf, and L is the inductance of the inductive filter section 40, which is known). This quadrature is $i_q^+$ωL term is provided ("cross coupled") as a negative input to the summing junction 134, along with the output of the PI controller 132 and the positive sequence direct voltage component $v_d^+$.

Analogously, the positive sequence direct component of current $i_d^+$ is provided to a multiplier 152 where it is multiplied by ωL. This direct $i_d^+$ωL term is provided ("cross coupled") as a positive input to the summing junction 144, along with the output of the PI controller 142 and the positive sequence quadrature voltage component $v_q^+$.

The outputs of the summing junctions 134 and 144 are positive sequence direct and quadrature reference voltages, $v_d^{+*}$ and $v_q^{+*}$, respectively, which are combined and transformed by a transformation matrix 160 to positive sequence two phase reference voltages $v_{\alpha\beta}^{+*}$. Similarly, from the negative sequence control section 104, outputs of the summing junctions are negative sequence direct and quadrature reference voltages, $v_d^{-*}$ and $v_q^{-*}$, respectively, which are combined and transformed by a transformation matrix 170 to negative sequence two phase reference voltages $v_{\alpha\beta}^{-*}$.

The positive sequence and negative sequence two phase reference voltages are combined at a summing junction 180 to provide a two phase reference voltage signal $v_{\alpha\beta}^*$. The two phase reference voltage signal $v_{\alpha\beta}^*$ is provided to a pulse width modulation (PWM) module 190 which computes and provides on-off switching commands to a switch gate driver board to operate the switches $S_1$-$S_6$ in the switch section 50 of the inverter 10. The PWM module 190 is a digital signal processor (DSP) which uses some form of pulse-width modulation calculation (such as Space Vector PWM, Sinusoidal PWM, Third Harmonic Injection PWM, etc.) to compute switch on-off sequences based on the reference voltage signal.

In the voltage transformation section 106, the filters 114 and 118 are second order low-pass filters, with a cut off frequency set to, for example, $\omega_f = \omega/\sqrt{2}$. Through the filters 114 and 118, positive and negative sequence voltages are divided successfully from the measured signals. However, two disadvantages exist with this approach. One is the signal feedback delay, and another is that all voltage harmonics are filtered out. The quality of the current control is very sensitive to real-time voltage measurement. When the grid voltage includes harmonics, the filtering in the voltage transformation section 106 will cause much measurement information to be lost from the feedforward voltage signals.

Because of the difficulty in obtaining the positive and negative sequence dq voltages with accuracy and real-time, some control methods give up voltage feed forward control, and utilize PI control directly to compensate the grid voltage. The effect of this is dilemma is illustrated by four dashed circles 192/194/196/198 in FIG. 2. The circles 192-198 show where the positive and negative sequence dq voltages are used in the controller 100. On one hand, if the positive and negative sequence dq voltages are used in the controller 100 after being computed in the traditional way in the voltage transformation section 106, the feedforward voltages will suffer inaccuracy due to time lag and lack of harmonic information. On the other hand, if no feedforward voltage control is used (that is, the circles 192-198 are empty), then the controller 100 is attempting to compute reference voltage signals without vital information about actual grid voltage. Either way, it is very difficult to maintain the high quality output current.

Figure 3:
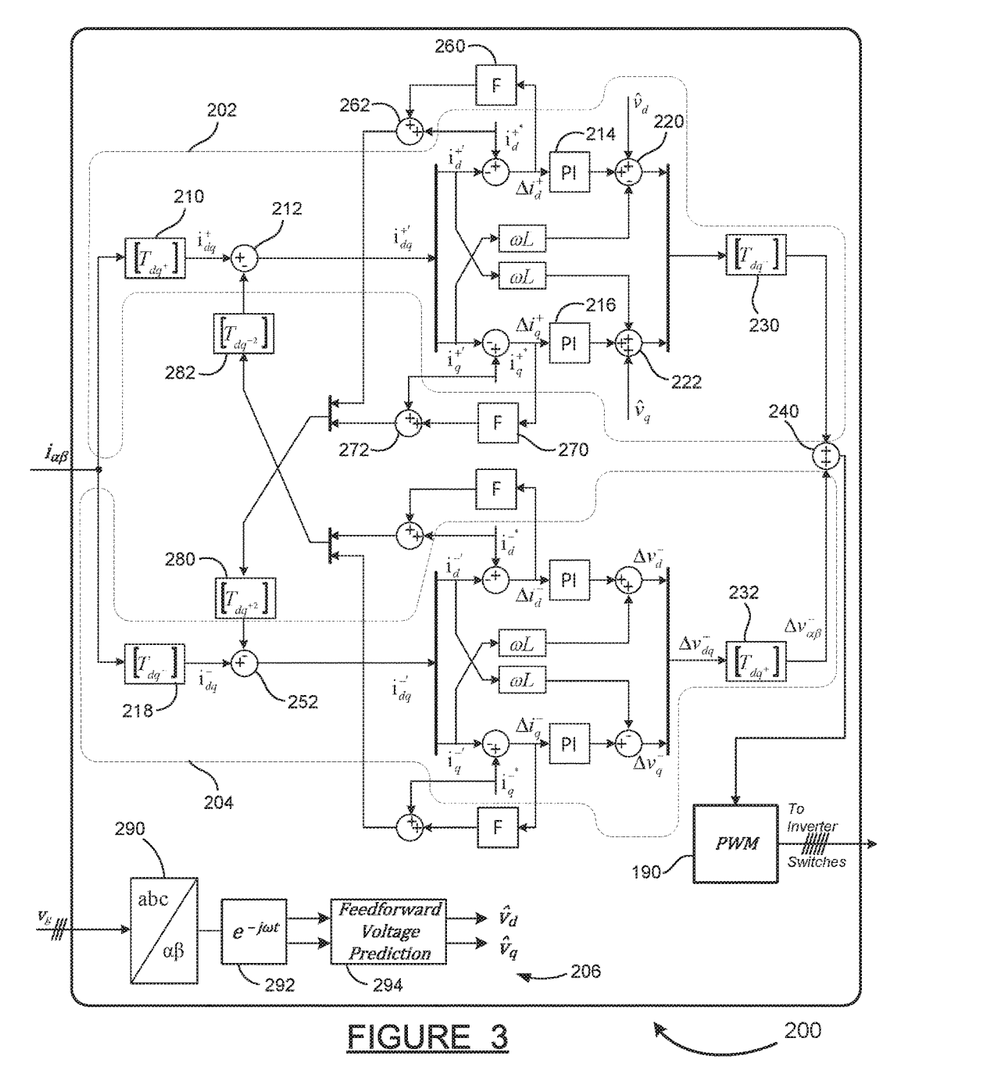
FIG. 3 is a block diagram of a controller using a new control scheme for controlling the inverter of FIG. 1 to provide negative sequence current based on an accurate predictive feedforward voltage signal, according to an embodiment of the present disclosure.

FIG. 3 is a block diagram of a controller 200 using a new control scheme for controlling the inverter 10 to provide negative sequence current based on an accurate predictive grid voltage signal, according to an embodiment of the present disclosure. As discussed in detail below, the new control scheme of the controller 200 addresses the grid feedforward voltage signal problems discussed above, thus enabling the inverter 10 to provide the negative sequence current needed during unbalanced grid operating conditions.

The controller 200, which is a new embodiment of the controller 70 of FIG. 1, includes many of the same components as the controller 100 of FIG. 2. These components, which are unchanged in operation from that discussed above, are unnumbered in FIG. 3 for the sake of clarity. The controller 200 includes a positive sequence control section 202 and a negative sequence control section 204. The positive sequence control section 202 includes the control elements shown within the dashed outline shape generally in the upper part of the figure, plus of course the input currents $i_{\alpha\beta}$ and the output of the summing junction leading to the PWM module 190 for switch control. The positive sequence control section 202 is included in a traditional controller for the inverter 10, other than the changes (in feedforward voltage determination and decoupling feedback) discussed below.

Also included in the controller 200 are elements outside the positive sequence control section 202 and the negative sequence control section 204. These additional elements comprise the decoupling & filter network (shown as item 120 in FIG. 2 and discussed earlier), including the elements toward the left center portion of FIG. 3 and the filters and feedback lines leading thereto. This will also be discussed further below.

The controller 200 uses a decoupled double synchronous reference frame current controller with a decoupling network based on the reference and the error signals. But, unlike in the controller 100 discussed earlier, the grid voltage is directly fed forward to the positive sequence control through a predictive algorithm, so that the instantaneous voltage information is preserved, reducing the influence of grid voltage harmonics on the quality of the output current. The predictive voltages, $\hat{v}_d$ and $\hat{v}_q$, include the positive sequence, negative sequence, and even harmonic component information of the grid voltage signal, thus improving the accuracy of the feedforward voltage information and therefore the output control signal.

Following is a discussion of the positive sequence control section 202, highlighting the differences from the positive sequence control section 102 of the controller 100 discussed earlier, and including a discussion of the decoupling & filter feedback network which was treated as a black box in the earlier discussion.

The positive sequence control section 202 receives as input the currents $i_{\alpha\beta}$, which are produced by transforming the three phase measured currents into a two phase fixed reference frame as known in the art. The currents $i_{\alpha\beta}$ are transformed from the fixed reference frame to the dq synchronous frame at transformation block 210. Rather than use the positive sequence dq currents ($i_{dq}^+$) directly, as was done in the controller 100, in the controller 200 the measured currents are first modified at summing junction 212 to remove (subtract) the cross-coupled 2ω terms which were highlighted earlier in Equations (3) and (4). Recall from those equations that when analyzing an unbalanced condition in a double synchronous reference frame, the positive sequence currents $i_{dq}^+$ include a negative sequence current term having a coefficient of $I^-$ and varying with $\cos(2\omega t)$ and $\sin(2\omega t)$. It is this cross-coupled negative sequence 2ω term that is removed from $i_{dq}^+$ at the summing junction 212. The negative sequence currents $i_d^-0$ similarly include a positive sequence current term.

The output of the summing junction 212 is a modified positive dq current $i_{dq}^{+\prime}$. Henceforth in this disclosure, current values which have been modified by the decoupling & filter network (to remove the cross-coupled 2ω term) will be designated with a prime mark ('). From this point onward, the positive sequence control section 202 operates in the same manner as that described previously for the controller 100. That is, the positive dq current vector $i_{dq}^{+\prime}$ is separated into its components $i_d^{+\prime}$ and $i_q^{+\prime}$, where each is compared to its corresponding reference current ($i_q^{+*}$ and $i_q^{+*}$) and the difference is passed through a PI controller (214 and 216). The output of each PI controller is forwarded to a summing junction (220 and 222), where it is combined with a cross-coupled iωL term (d to q, and q to d).

Also provided to each of the summing junctions (220, 222) is a feedforward voltage term. However, rather than using the transformed and filtered voltage signals $v_d^+$ and $v_q^+$, as in the controller 100, the controller 200 uses the predictive voltages $\hat{v}_d$ and $\hat{v}_q$ at the summing junctions 200 and 222. The predictive voltages $\hat{v}_d$ and $\hat{v}_q$ are computed in a voltage prediction section 206, and their computation according to an embodiment of the present disclosure is described further in a later section, including a discussion of FIG. 4.

The positive sequence control section 202 culminates at a transformation matrix 230 which transforms the positive sequence reference voltages $v_{dq}^{+*}$ from the synchronous dq frame to the two phase αβ frame reference voltages $v_{\alpha\beta}^{+*}$. The negative sequence control section 204 operates in a similar fashion, culminating at a transformation matrix 232 which transforms the negative sequence reference voltages $v_{dq}^{-*}$ from the synchronous dq frame to the two phase αβ frame reference voltages $v_{\alpha\beta}^{-*}$. The outputs of the transformation matrices 230 and 232 are combined at summing junction 240, which provides its output $v_{\alpha\beta}^*$ to the PWM module 190 for switch command computation as described earlier.

The decoupling & filter network, which provided feedback to the summing junction 212 and its equivalent 252 in the negative sequence control section 204, operates as follows. On the direct side of the positive sequence control section 202, ahead of the PI controller 214, a branch of the Did signal is provided to a filter block 260. The filter block 260 performs a low-pass filter operation on the $\Delta i_d^+$ signal in order to obtain a current error mean value. The output of the filter block 260 is provided to a summing junction 262 where it is added to the corresponding reference current signal. A filter block 270 and a summing junction 272 perform the same operations on the quadrature side of the positive sequence control section 202.

The outputs of the summing junctions 262 (d) and 272 (q) on the positive sequence side are joined and provided (cross-coupled) to a transformation matrix 280 on the negative sequence side. The transformation matrix 280 performs a double-frequency complex transformation to make the signal compatible with the transformed negative sequence output of the measured currents from transformation matrix 218. The output of the transformation matrix 280 is subtracted from the negative sequence currents $i_d^-$ at the summing junction 252 as discussed previously, to provide the modified negative dq current $i_{dq}^{-\prime}$. Corresponding filtering and feedback operations are performed in the negative sequence control section 204, providing feedback to the transformation matrix 282 which modifies the positive sequence currents at the summing junction 212.

The decoupling & filter network, providing cross-coupled feedback to remove the cross-coupled 2ω oscillation terms which were highlighted earlier in Equations (3) and (4), enables the positive sequence control section 202 and the negative sequence control section 204 to operate on modified measured current signals which avoid perpetuating these oscillations, thus producing better quality output from the controller 200.

The preceding discussion describes the elements and features of the controller 200 in FIG. 3. As discussed above, the decoupled double synchronous reference frame of the controller 200 provides a very effective platform for inverter current control under unbalanced grid operating conditions, but the effectiveness can be improved through the introduction of a predictive feedforward voltage signal to the summing junctions 220 and 222.

Figure 4:
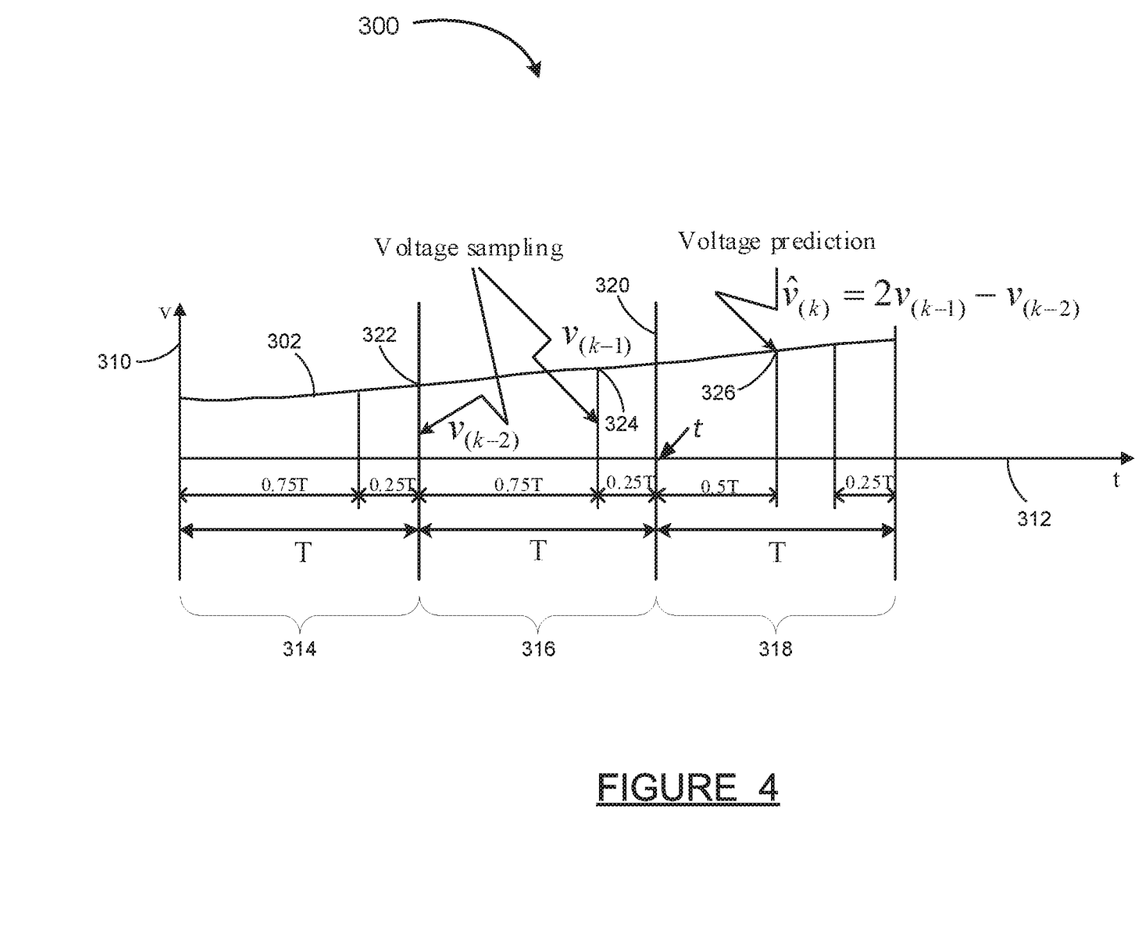
FIG. 4 is a graph of voltage vs. time which illustrates a predictive voltage calculation technique used in the controller of FIG. 3, in an embodiment of the present disclosure.

FIG. 4 is a graph 300 of voltage vs. time which illustrates a predictive voltage calculation technique used in the controller 200 in an embodiment of the present disclosure. A voltage curve 302 is plotted on a graph having voltage on a vertical axis 310 and time on a horizontal axis 312. A control cycle time step T is shown at 316, along with a previous control cycle 314 and a next control cycle 318. The current time t is shown at 320.

The feedforward voltage prediction calculation begins with the measured three phase voltages (a/b/c) from the voltage sensors 12/14/16 in FIG. 1 for the current sampling time. Referring again to FIG. 3, the measured grid voltages are converted from three phase to two phase (αβ) in the conventional manner at transformation module 290. The two phase voltages are converted from the fixed (αβ) reference frame to the rotating direct-quadrature (dq) reference frame at transformation module 292. The transformation module 292 transforms the grid voltage measurements to dq components $v_d^+$ and $v_q^+$, as would be done in a conventional inverter control process that only considers positive sequence current and voltage.

In block 294, the voltage prediction shown in FIG. 4 is performed on the direct and quadrature components $v_d^+$ and $v_q^-$ from the transformation module 292, producing the predictive feedforward voltages $\hat{v}_d$ and $\hat{v}_q$. As discussed previously—some prior art controllers perform positive and negative sequence current control calculations without any feedforward voltage signal. Other prior art methods attempt to transform the grid voltage into four feedforward voltage signals (positive and negative sequence, direct and quadrature), as shown in the controller 100 of FIG. 2; however, this technique suffers from the loss of harmonics and the time lag resulting from the low-pass filters. By using the direct and quadrature components $v_d^+$ and $v_q^+$ from the previous control cycle in a predictive voltage calculation, the disclosed method achieves the advantages of using a feedforward voltage control signal without the disadvantages of using a filter in creating the feedforward voltage signal.

Two rules of voltage prediction are to be followed. The first rule is that the predictive voltage $\hat{v}_{dq}$ should be equal to the average voltage of the next control cycle 318, when only considering positive sequence voltage, and is represented in Equation (5):

$$\hat{v}_{d,q}(k) = v_{d,q}(k) \qquad (5)$$

The second rule is that the predictive voltage error should be as small as possible, when the negative sequence voltage exists, as shown in Equation (6):

$$|\hat{v}_{d,q}(k) - v_{d,q}(k)| \Rightarrow \text{Minimum} \qquad (6)$$

In order to satisfy the two rules described above, a voltage prediction method based on voltage samplings shown in FIG. 4 is used in the block 294. There are two samplings in one control cycle, and their positions are shown in FIG. 4. A measurement sample $v_{(k-2)}$—shown at 322—is taken at the end of the previous control cycle 314. A measurement sample $v_{(k-1)}$—shown at 324—is taken at a time 75% of the way through the current control cycle 316. A voltage prediction $\hat{v}_{(k)}$—shown at 326 for the midpoint of the next control cycle 318—can then be computed as an extrapolation of the two samples from the previous and current control cycles 314 and 316. The grid voltage predictive method is:

$$\hat{v}_{d,q}(k) = 2v_{d,q}(k-1) - v_{d,q}(k-2) \quad (7)$$

Assuming the grid voltage vector v during an unbalanced condition is:

$$v = v^+ + v^- = V^+ \begin{bmatrix} \cos(\omega t) \\ \cos\left(\omega t - \frac{2\pi}{3}\right) \\ \cos\left(\omega t + \frac{2\pi}{3}\right) \end{bmatrix} + V^- \begin{bmatrix} \cos(\omega t + \phi^-) \\ \cos\left(\omega t + \frac{2\pi}{3} + \phi^-\right) \\ \cos\left(\omega t - \frac{2\pi}{3} + \phi^-\right) \end{bmatrix} \quad (8)$$

Where $V^+$ and $V^-$ are the positive and negative sequence voltage coefficients, respectively, $\omega$ is the angular frequency of the alternating current (which is equal to $2\pi f$), and $\phi^-$ is a negative sequence phase angle. Then, for the positive sequence voltage component $v^+$, $$\begin{bmatrix} v_d^+ \\ v_q^+ \end{bmatrix} = \quad (9)$$

$$\frac{2}{3} V^+ \begin{bmatrix} \cos(\omega t) & \cos\left(\frac{\omega t - 2\pi}{3}\right) & \cos\left(\frac{\omega t + 2\pi}{3}\right) \\ -\sin(\omega t) & -\sin\left(\frac{2\pi}{3}\right) & -\sin\left(\frac{2\pi}{3}\right) \end{bmatrix} \begin{bmatrix} \cos(\omega t) \\ \cos\left(\frac{\omega t - 2\pi}{3}\right) \\ \cos\left(\frac{\omega t + 2\pi}{3}\right) \end{bmatrix} = V^+ \begin{bmatrix} 1 \\ 0 \end{bmatrix}$$

The predictive positive sequence voltage $\hat{v}_{dq}^+$ can thus be computed as:

$$\begin{bmatrix} \hat{v}_d^+(k) \\ \hat{v}_q^+(k) \end{bmatrix} = 2 \begin{bmatrix} v_d^+(k-1) \\ v_q^+(k-1) \end{bmatrix} - \begin{bmatrix} v_d^+(k-2) \\ v_q^+(k-2) \end{bmatrix} \quad (10)$$

$$= 2V^+ \begin{bmatrix} 1 \\ 0 \end{bmatrix} - V^+ \begin{bmatrix} 1 \\ 0 \end{bmatrix}$$

$$= V^+ \begin{bmatrix} 1 \\ 0 \end{bmatrix}$$

$$= \begin{bmatrix} v_d^+(k) \\ v_q^+(k) \end{bmatrix}$$

Where the time steps k, k−1, and k−2 are shown in FIG. 4 and were described above.

For the negative sequence voltage component with positive sequence voltage analysis method:

$$\begin{bmatrix} v_{d-} \\ v_{q-} \end{bmatrix} = \quad (11)$$

$$\frac{2}{3} V^- \begin{bmatrix} \cos(\omega t) & \cos\left(\frac{\omega t - 2\pi}{3}\right) & \cos\left(\frac{\omega t + 2\pi}{3}\right) \\ -\sin(\omega t) & -\sin\left(\frac{2\pi}{3}\right) & -\sin\left(\frac{2\pi}{3}\right) \end{bmatrix} \begin{bmatrix} \cos(\omega t + \phi^-) \\ \cos\left(\frac{\omega t + 2\pi}{3} + \phi^-\right) \\ \cos\left(\frac{\omega t - 2\pi}{3} + \phi^-\right) \end{bmatrix} =$$

$$V^- \begin{bmatrix} \cos(2\omega t + \phi^-) \\ -\sin(2\omega t + \phi^-) \end{bmatrix}$$

The predictive negative sequence voltage component with positive sequence voltage analysis method is:

$$\begin{bmatrix} \hat{v}_{d-}(k) \\ \hat{v}_{q-}(k) \end{bmatrix} = 2 \begin{bmatrix} v_{d-}(k-1) \\ v_{q-}(k-1) \end{bmatrix} - \begin{bmatrix} v_{d-}(k-2) \\ v_{q-}(k-2) \end{bmatrix} = \quad (12)$$

$$V^- \left\{ 2 \begin{bmatrix} \cos(2\omega(t-0.25T) + \phi^-) \\ -\sin(2\omega(t-0.25T) + \phi^-) \end{bmatrix} - \begin{bmatrix} \cos(2\omega(t-T) + \phi^-) \\ -\sin(2\omega(t-T) + \phi^-) \end{bmatrix} \right\}$$

The difference between the actual voltage and the predictive voltage is:

$$\begin{bmatrix} \Delta v_d \\ \Delta v_q \end{bmatrix} = \begin{bmatrix} \Delta v_d^+ \\ \Delta v_q^+ \end{bmatrix} + \begin{bmatrix} \Delta v_{d-} \\ \Delta v_{q-} \end{bmatrix} = \begin{bmatrix} v_d^+(k) \\ v_{q+}^+(k) \end{bmatrix} - \begin{bmatrix} \hat{v}_d^+(k) \\ \hat{v}_q^+(k) \end{bmatrix} + \begin{bmatrix} v_{d-}(k) \\ v_{q-}(k) \end{bmatrix} - \quad (13)$$

$$\begin{bmatrix} \hat{v}_{d-}(k) \\ \hat{v}_{q-}(k) \end{bmatrix} =$$

$$V^- \left\{ \begin{bmatrix} [\cos(2\omega t + \phi^-)(\cos(\omega T) + \cos(2\omega T) - 2\cos(0.5\omega T)) + \\ \sin(2\omega t + \phi^-)(-\sin(\omega T) - 2\sin(0.5\omega T) + \sin(2\omega T)] \\ [-\sin(2\omega t + \phi^-)(\cos(\omega T) + \cos(2\omega T) - 2\cos(0.5\omega T)) + \\ -\cos(2\omega t + \phi^-)(\sin(\omega T) + 2\sin(0.5\omega T) - \sin(2\omega T)] \end{bmatrix} \right\}$$

It is observed in Equation (13) that the difference between the actual voltage and the predictive voltage includes only a negative sequence component. This is because, as shown in Equation (10) above, the predictive positive sequence voltage $\hat{v}_{dq}^+$ is equal to the actual positive sequence voltage $v_{dq}^+$, and therefore the $\Delta v_{dq}^+$ term (positive sequence difference) of Equation (13) is zero and drops out.

Furthermore, the difference between the actual voltage and the predictive voltage can be made small by taking two measurement samples per control cycle. When the switching frequency is 4800 Hz and the number of the control plan updates in one control cycle is two, the value of $\omega T$ is calculated in Equation (14) and the predictive error is shown in Equation (15).

$$\omega T = 377 \times \frac{1}{4800 \times 2} = 0.0393 = 2.25° \quad (14)$$

$$\begin{bmatrix} \Delta v_d \\ \Delta v_q \end{bmatrix} = V^- \left\{ \begin{bmatrix} -0.0035\cos(2\omega t + \phi^-) - 0.00007\sin(2\omega t + \phi^-) \\ 0.0035\sin(2\omega t + \phi^-) + 0.00007\cos(2\omega t + \phi^-) \end{bmatrix} \right\} \quad (15)$$

Other prediction techniques, sampling timing and control plan update sequences could also be used. However, the method described above has yielded good results and is a recommended approach.

The predictive positive sequence voltage $\hat{v}_{dq}^+(k)$, computed as described above in the feedforward voltage prediction block 294, is then used in the controller 200 as the feedforward voltage signal $\hat{v}_d$ provided to the summing junction 220, and the feedforward voltage signal $\hat{v}_q$ provided to the summing junction 222.

Figure 5:
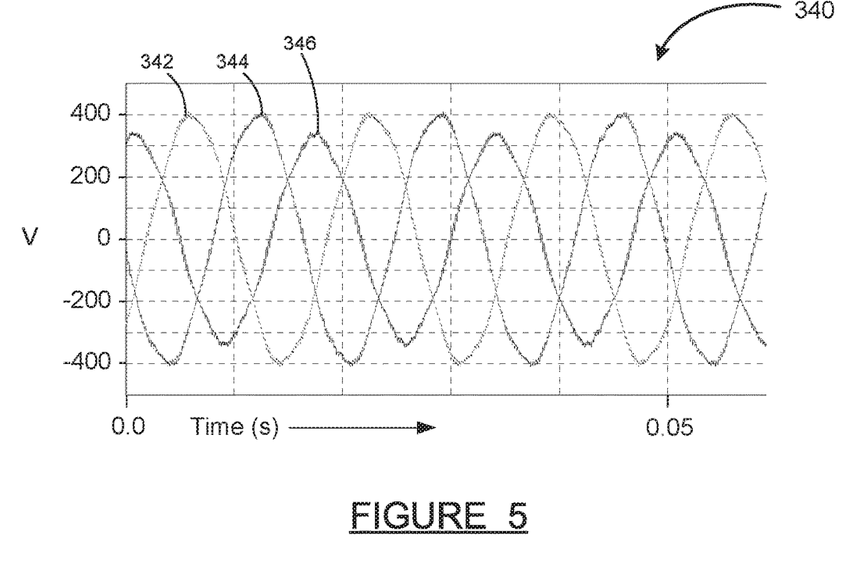
FIG. 5 is a graph of three phase grid voltages at the inverter of FIG. 1 during an unbalanced operating condition.

FIG. 5 is a graph 340 of three phase grid voltages at the inverter 10 in FIG. 1 during an unbalanced operating condition. Three phase voltage curves are shown, where phase A is depicted by curve 342, phase B is depicted by curve 344 and phase C is depicted by curve 346. As would be expected, all three phases are observed to be sine wave shapes at a frequency of 60 Hz. It can be seen in the graph 340 that phases A & B are oscillating between about +400V and −400V. However, phase C is only reaching peak voltages of about +/−350V. Thus, an unbalanced condition exists on the grid, which may be caused by a fault or a sudden load increase on phase C. It is this situation which the disclosed control scheme is designed to address.

Figure 6:
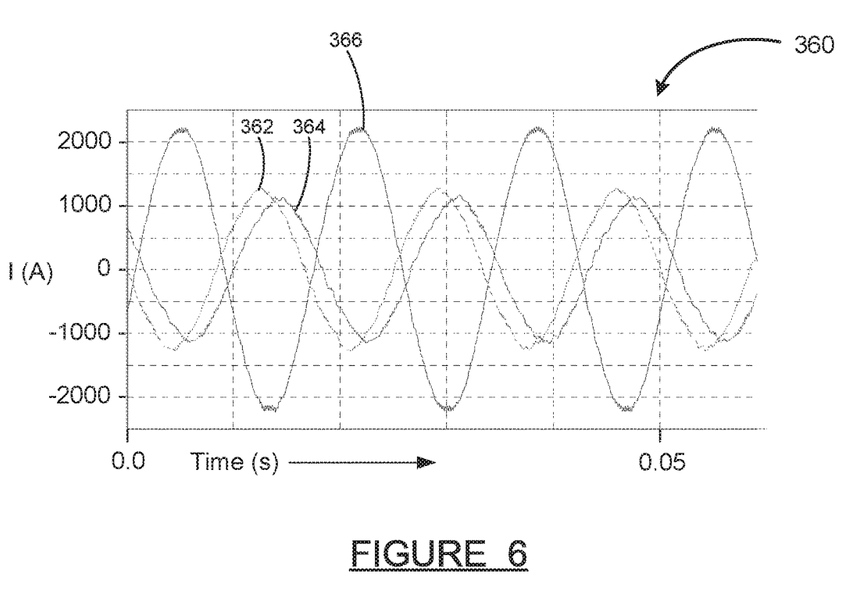
FIG. 6 is a graph of three phase output currents from the inverter using the control scheme of the present disclosure, during the unbalanced operating condition of FIG. 5.

FIG. 6 is a graph 360 of three phase output currents from the inverter 10 in FIG. 1 using the control scheme of the present disclosure, during the unbalanced operating condition of FIG. 5. Three phase current curves are shown, where phase A is depicted by curve 362, phase B is depicted by curve 364 and phase C is depicted by curve 366. Recall from FIG. 5 that phase C is experiencing a low voltage condition. It can be seen in the graph 360 that the current injected by the inverter 10 to phase C is about double the current of phases A & B. Thus, the inverter 10 using the controller 200 in FIG. 3 is performing as desired—providing substantial additional current to the grid phase which is experiencing a low voltage—thereby preventing further deterioration of the voltage on phase C and restoring balance in grid voltage across all phases.

Figure 7:
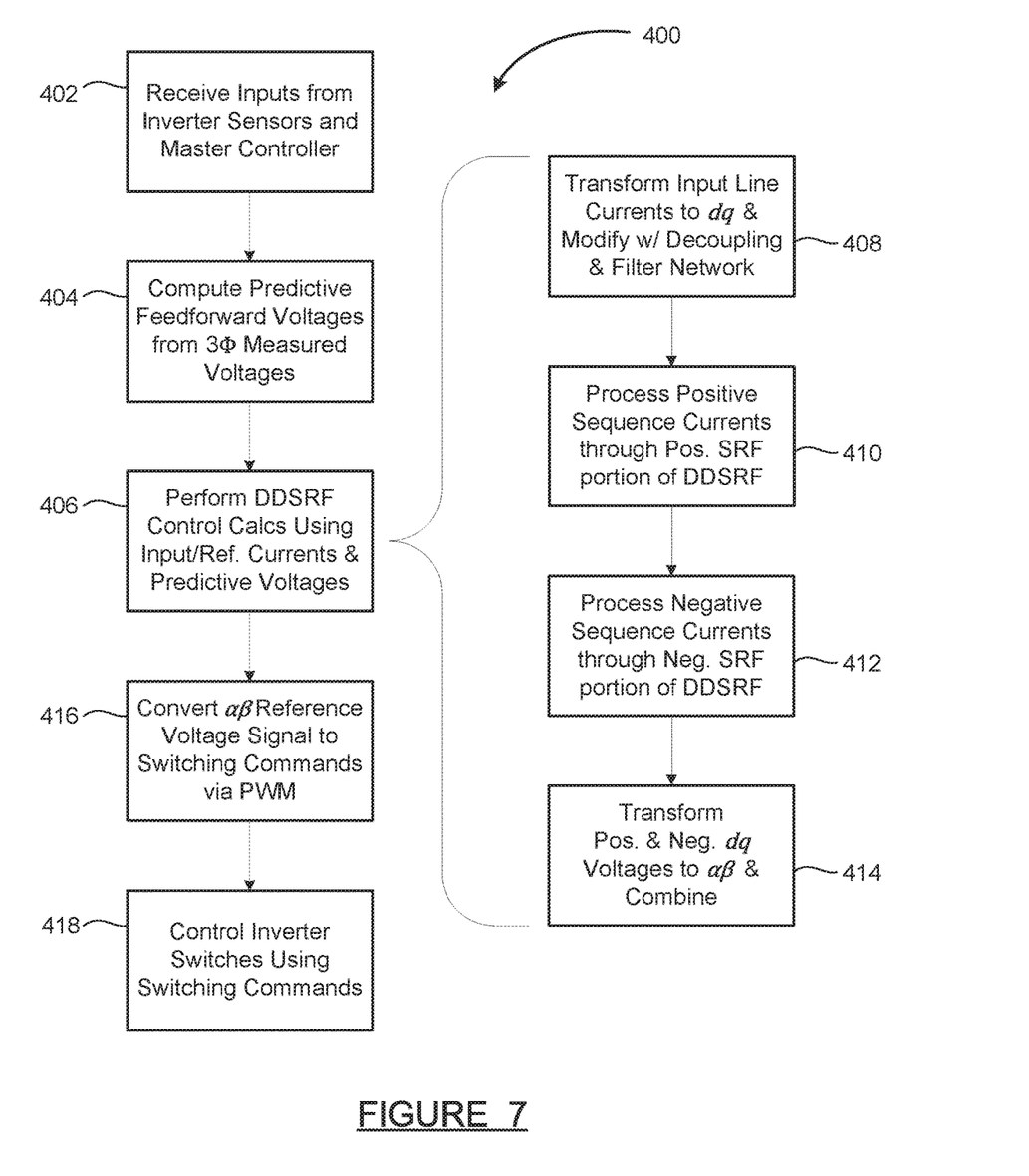
FIG. 7 is a flowchart diagram of a method for controlling the inverter according to the presently disclosed embodiment shown in the controller block diagram of FIG. 3.

FIG. 7 is a flowchart diagram 400 of a method for controlling the inverter 10 in FIG. 1 according to the presently disclosed embodiment shown in the block diagram of the controller 200 of FIG. 3. At box 402, the inverter controller 200 receives the inputs needed for the control calculations. As discussed above, the inputs include three phase grid voltages (amplitude and phase) from the voltage sensors 12/14/16, three phase grid-inverter current from the current sensors 22/24/26 and DC-link voltage from the voltage sensor at the DC-link capacitor bank 60. A direct current reference signal is computed based on the DC-link voltage. The inputs also include a quadrature current reference signal, indicative of the required amount of reactive power, from the master controller.

At box 404, predictive feedforward voltages $\hat{v}_d$ and $\hat{v}_q$ are computed from the three phase grid voltages, including converting three phase grid voltages to positive sequence direct and quadrature components for each measurement sample, and computing the predictive feedforward voltages for a next control cycle based on one or more measurement samples from a previous control cycle. In a preferred embodiment, this includes using the equations:

$$\hat{v}_d(k)=2 \cdot v_d(k-1)-v_d(k-2) \qquad (16)$$

$$\hat{v}_q(k)=2 \cdot v_q(k-1)-v_q(k-2) \qquad (17)$$

Where $\hat{v}_d(k)$ and $\hat{v}_q(k)$ are the predictive voltages used at the next control cycle k in the summing junctions 220 and 222 in FIG. 3, respectively, $v_d$ and $v_q$ are the direct and quadrature voltages computed by transforming the grid voltages, and k−1 and k−2 are the designators for the measurement samples from the previous control cycle.

At box 406, the predictive feedforward voltages, the three phase measured currents and the direct and quadrature reference currents are processed through a decoupled double synchronous reference frame (DDSRF) control algorithm as shown in the controller 200 to provide positive & negative sequence αβ reference voltages.

The box 406 includes, at box 408, transforming the measured three phase grid-inverter currents to positive sequence and negative sequence dq currents, and modifying the positive sequence and negative sequence dq currents with a decoupling & filter network to remove a 2ω oscillation term. After modification by the decoupling & filter network, the dq currents are referred to as modified currents.

The DDSRF at the box 406 further includes, at boxes 410 and 412, processing the positive sequence dq currents through a synchronous reference frame (SRF) controller to compute a positive sequence dq reference voltage, and processing the negative sequence dq currents through an SRF controller to compute a negative sequence dq reference voltage. The positive and negative sequence SRF controllers include, for each of direct and quadrature, comparing the modified current to a reference current, passing a difference through a PI controller, combining the controller output with a cross-coupled iωL term at a summer, adding a predictive voltage at the summer, and transforming from the dq reference frame to the αβ reference frame. For the positive sequence SRF, the predictive voltages used in the summers are $\hat{v}_d$ and $\hat{v}_q$. For the negative sequence SRF, predictive voltages are not used in the summers.

The DDSRF at the box 406 finally includes, at box 414, transforming the positive & negative sequence dq reference voltages to produce positive & negative sequence αβ reference voltages, and combining the positive & negative sequence αβ reference voltages to produce a combined αβ reference voltage signal.

The decoupling & filter network used in the DDSRF of the box 406 includes filters and summers which compute a positive sequence decoupling current signal which undergoes a 2ω transformation and is used to modify the negative sequence dq currents, and filters and summers which compute a negative sequence decoupling current signal which undergoes a 2ω transformation and is used to modify the positive sequence dq currents.

At box 416, the combined αβ reference voltage signal is processed through a PWM module to provide switching commands for the inverter 10. At box 418, the switching commands are provided to a driver board in the inverter 10, thus controlling the inverter 10 to produce desired three phase injection currents (as shown in FIG. 6) in order to counteract unbalanced grid voltage conditions (as shown in FIG. 5).

As will be well understood by those skilled in the art, the several and various steps and processes discussed herein to describe the disclosed methods may be referring to operations performed by a computer, a processor or other electronic calculating device that manipulate and/or transform data using electrical phenomenon. In particular, this refers to the control calculations and operations performed by the controllers 100 and 200. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The new inverter control scheme described above enables a grid-connected reactive power compensation inverter to provide current injection to the grid which counteracts unbalanced grid voltage operating conditions. The control scheme uses positive and negative sequence control sections in order to detect and correct the unbalance condition, and uses predictive feedforward voltage signals to provide effective and accurate control. With this improved inverter functionality for maintaining grid stability, the new control scheme provides significant benefit to the inverter manufacturer and its customers, and to all consumers on the grid.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for controlling a grid-connected three phase inverter to counteract unbalanced grid voltage conditions, the method comprising:
    receiving, by an inverter controller, inputs including measured three phase grid voltage signals and measured three phase grid-inverter current signals from sensors, and direct and quadrature reference current signals;
    computing, using a processor in the inverter controller, first predictive feedforward voltages from the measured grid voltage signals, including converting three phase grid voltages to positive sequence direct and quadrature components for each measured grid voltage signal, and computing direct and quadrature predictive second feedforward voltages for a next control cycle based on one or more measured grid voltage signals from a previous control cycle;
    performing, using the processor, control calculations using a decoupled double synchronous reference frame (DDSRF) algorithm, where the DDSRF algorithm uses the first and second predictive feedforward voltages along with the measured three phase grid-inverter current signals as inputs, and the DDSRF algorithm produces a two phase alpha-beta ($\alpha\beta$) reference voltage signal as output;
    converting the two phase $\alpha\beta$ reference voltage signal to switching commands using a pulse width modulation (PWM) algorithm; and
    providing the switching commands to a switch driver board in the inverter to control operation of bridge arm power switches in the inverter.

2. The method according to claim 1 wherein computing the first and second predictive feedforward voltages includes using equations:

$$\hat{v}_d(k) = 2 \cdot v_d(k-1) - v_d(k-2)$$

$$\hat{v}_q(k) = 2 \cdot v_q(k-1) - v_q(k-2)$$

where $\hat{v}_d(k)$ and $\hat{v}_q(k)$ are the second predictive feedforward voltages used at a next control cycle k in a positive sequence branch of the DDSRF algorithm, $v_d$ and $V_q$ are direct and quadrature voltages computed by transforming the measured grid voltage signals, and k−1 and k−2 are designators for the measured grid voltage signal from the current and previous control cycles, respectively.

3. The method according to claim 2 wherein the measured grid voltage signal k−2 is taken at a time at an end of the previous control cycle, the measured grid voltage signal k−1 is taken at a time 75% through the current control cycle, and k represents a midpoint of a next control cycle.

4. The method according to claim 1 wherein the DDSRF algorithm includes transforming the measured three phase currents to positive sequence and negative sequence direct and quadrature (dq) currents, modifying the positive sequence and negative sequence dq currents with a decoupling & filter network to remove a 2ω oscillation term, and processing the modified positive sequence and negative sequence dq currents through a positive sequential reference frame (SRF) control branch and a negative SRF control branch, respectively.

5. The method according to claim 4 wherein the positive SRF control branch includes, for each of direct and quadrature, comparing the modified current to a reference current to form a difference, passing the difference through a proportional-integral (PI) controller, combining an output of the PI controller with a cross-coupled iωL term at a summer, adding the first predictive feedforward voltage at the summer, and transforming an output of the summer from a dq reference frame to an $\alpha\beta$ reference frame.

6. The method according to claim 4 wherein the negative SRF control branch includes, for each of direct and quadrature, comparing the modified current to a reference current to form a difference, passing the difference through a proportional-integral (PI) controller, combining an output of the PI controller with a cross-coupled iωL term at a summer, adding no feedforward voltage at the summer, and transforming an output of the summer from a dq reference frame to an $\alpha\beta$ reference frame.

7. The method according to claim 4 wherein the decoupling & filter network includes filters and summers which use feedback signals from the positive SRF control branch to compute a positive sequence decoupling current signal which undergoes a 2ω transformation and is used to modify the negative sequence dq currents, and filters and summers which use feedback signals from the negative SRF control branch to compute a negative sequence decoupling current signal which undergoes a 2ω transformation and is used to modify the positive sequence dq currents.

8. The method according to claim 1 wherein the quadrature reference current signals are provided by a master controller and indicate a required amount of active power and reactive power to be provided by the inverter.

9. The method according to claim 1 wherein the PWM algorithm uses a Sinusoidal PWM, Space Vector PWM or Third Harmonic Injection PWM algorithm to compute the switching commands for the power switches in the inverter.

10. The method according to claim 1 wherein the inverter is a grid-connected reactive power compensation inverter.

11. The method according to claim 1 wherein the inverter counteracts the unbalanced grid voltage conditions by providing a greater current to a grid phase of three grid phases which has a lower voltage than the other two grid phases of the three phases.

12. A method for controlling a grid-connected three phase reactive power compensation inverter to counteract unbalanced grid voltage conditions, said method comprising:
    receiving, by an inverter controller, inputs including measured three phase grid voltage signals and measured three phase grid-inverter current signals from sensors, and direct and quadrature reference current signals;
    computing, using a processor in the inverter controller, first predictive feedforward voltages from the measured grid voltage signals, including converting three phase grid voltages to positive sequence direct and quadrature components for each measured grid voltage signal, and computing direct and quadrature second predictive feedforward voltages for a next control cycle based on two measured grid voltage signals from a previous control cycle, where the two measured grid voltage signals are taken at a time at an end of the previous control cycle at a time 75% through a current control cycle;

performing, using the processor, control calculations using a decoupled double synchronous reference frame (DDSRF) algorithm, where the DDSRF algorithm uses the first predictive feedforward voltages along with the direct and quadrature reference current signals as inputs, and the DDSRF algorithm produces a two phase alpha-beta (αβ) reference voltage signal as output;

converting the two phase αβ reference voltage signal to switching commands using a Space Vector pulse width modulation (PWM) algorithm; and providing the switching commands to a switch driver board in the inverter to control operation of bridge arm power switches in the inverter, where the switching commands cause the inverter to counteract the unbalanced grid voltage conditions by providing a different current amplitude to each grid phase.

13. The method according to claim 12 wherein computing the first and second predictive feedforward voltages includes using the equations:

$$\hat{v}_d(k)=2 \cdot v_d(k-1)-v_d(k-2)$$

$$\hat{v}_q(k)=2 \cdot v_q(k-1)-v_q(k-2)$$

Where $\hat{v}_d(k)$ and $\hat{v}_q(k)$ are the second predictive feedforward voltages used at a next control cycle k in a positive sequence branch of the DDSRF algorithm, $v_d$ and $v_q$ are direct and quadrature voltages computed by transforming the measured grid voltage signals, and k−1 and k−2 are designators for the measured grid voltage signal from the current and previous control cycles, respectively.

14. The method according to claim 12 wherein the DDSRF algorithm includes transforming the measured three phase currents to positive sequence and negative sequence direct and quadrature (dq) currents, modifying the positive sequence and negative sequence dq currents with a decoupling & filter network to remove a 2ω oscillation term, and processing the modified positive sequence and negative sequence dq currents through a positive sequential reference frame (SRF) control branch and a negative SRF control branch, respectively, where the positive SRF control branch uses the direct and quadrature predictive feedforward voltages in summing junctions, and the negative SRF control branch uses no feedforward voltages.

15. A controller for controlling a grid-connected three phase inverter to counteract unbalanced grid voltage conditions, the controller comprising:

a processor configured in accordance with a set of non-transitory instructions stored within a memory associated with the processor to:

receive inputs including measured three phase grid voltage signals and measured three phase grid-inverter current signals from sensors, and direct and quadrature reference current signals;

to perform control calculations using a decoupled double synchronous reference frame (DDSRF) algorithm, where the DDSRF algorithm uses first predictive feedforward voltages along with the direct and quadrature reference current signals as inputs, and the DDSRF algorithm produces a two phase alpha-beta (αβ) reference voltage signal as output, where the predictive feedforward voltages are computed by the processor from the measured grid voltage signals, including converting the measured three phase grid voltages to positive sequence direct and quadrature components for each measured grid voltage signal, and computing direct and quadrature second predictive feedforward voltages for a next control cycle based on one or more measured grid voltage signals from a previous control cycle; and a duty cycle controller operably associated with and configured to control a plurality of inverter switches based on the two phase αβ reference voltage signal.

16. The controller according to claim 15 wherein the first and second predictive feedforward voltages are computed in the processor using equations:

$$\hat{v}_d(k)=2 \cdot v_d(k-1)-v_d(k-2)$$

$$\hat{v}_q(k)=2 \cdot v_q(k-1)-v_q(k-2)$$

where $\hat{v}_d(k)$ and $\hat{v}_q(k)$ are the second predictive feedforward voltages used at a next control cycle k in a positive sequence branch of the DDSRF algorithm, $v_d$ and $v_q$ are direct and quadrature voltages computed by transforming the measured grid voltage signals, and k−1 and k−2 are designators for the measured grid voltage signals from current and previous control cycles, respectively.

17. The controller according to claim 16 wherein the measured grid voltage signal k−2 is taken at a time at an end of the previous control cycle, the measured grid voltage signal k−1 is taken at a time 75% through the current control cycle, and k represents a midpoint of a next control cycle.

18. The controller according to claim 15 wherein the DDSRF algorithm includes transforming the measured three phase currents to positive sequence and negative sequence direct and quadrature (dq) currents, modifying the positive sequence and negative sequence dq currents with a decoupling & filter network to remove a 2ω oscillation term, and processing the modified positive sequence and negative sequence dq currents through a positive sequential reference frame (SRF) control branch and a negative SRF control branch, respectively, where the positive SRF control branch uses the direct and quadrature predictive feedforward voltages in summing junctions, and the negative SRF control branch uses no feedforward voltages.

19. The controller according to claim 15 wherein the inverter is a grid-connected reactive power compensation inverter and where the inverter counteracts the unbalanced grid voltage conditions by providing a different current amplitude to each grid phase.

20. The controller according to claim 15 wherein a duty cycle controller is a PWM module in the controller which uses a Sinusoidal PWM, Space Vector PWM or Third Harmonic Injection PWM algorithm to compute the duty cycles of the inverter switches.

\* \* \* \* \*